March 11, 1958 D. A. COWHIG 2,826,468
PISTON RING ASSEMBLY AND METHOD OF INSTALLING THEREOF
Filed Jan. 5, 1954 2 Sheets-Sheet 1
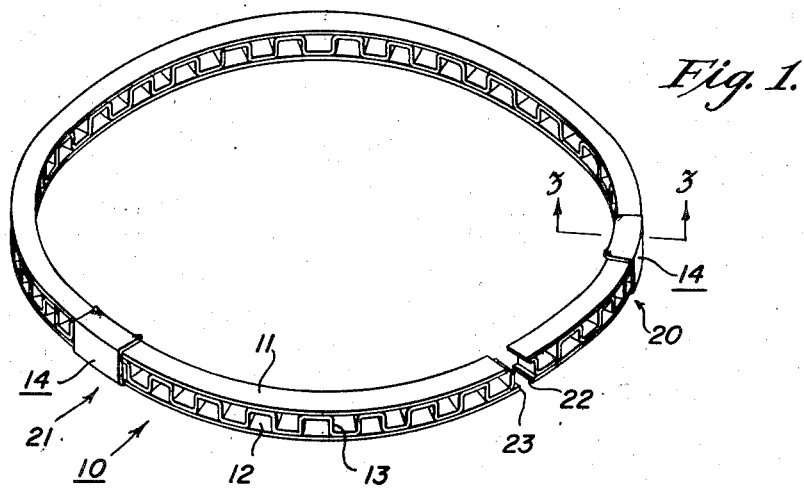
Fig. 1.
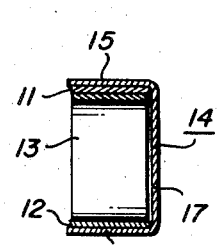
Fig. 3.
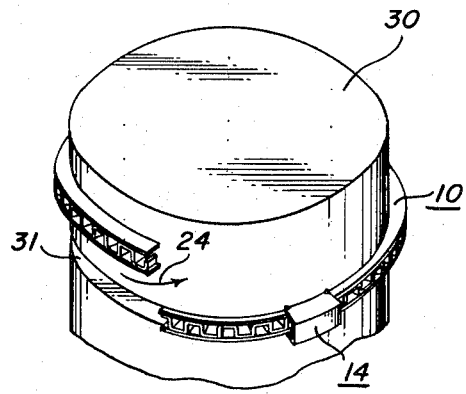
Fig. 2.
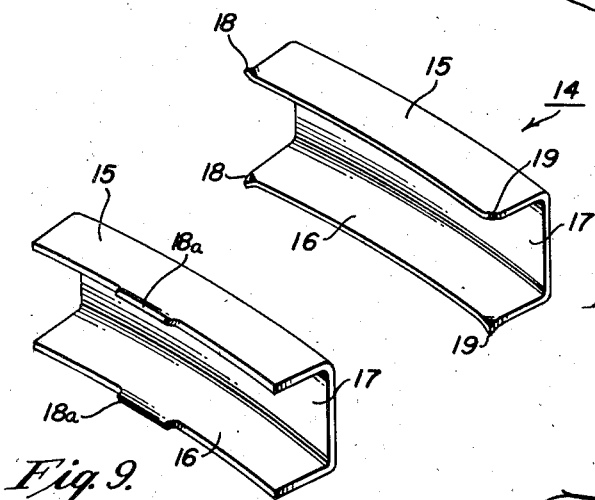
Fig. 6.
Fig. 9.
INVENTOR.
DAVID A. COWHIG
BY
*Leonard L. Kalish*
ATTORNEY.

March 11, 1958     D. A. COWHIG     2,826,468
PISTON RING ASSEMBLY AND METHOD OF INSTALLING THEREOF
Filed Jan. 5, 1954     2 Sheets-Sheet 2

INVENTOR.
DAVID A. COWHIG
BY
*Leonard L. Kalish*
ATTORNEY.

United States Patent Office 2,826,468
Patented Mar. 11, 1958

2,826,468
PISTON RING ASSEMBLY AND METHOD OF INSTALLING THEREOF

David A. Cowhig, Woodmere Park, Pa., assignor to Wilkening Manufacturing Co., Philadelphia, Pa., a corporation of Delaware Application January 5, 1954, Serial No. 402,229

7 Claims. (Cl. 309—24)

This invention relates to multi-piece piston rings. In particular, this invention relates to a multi-piece piston ring unit or assembly which permits rapid installation of the separable sealing elements or sealing and spacing elements thereof into the ring-receiving groove of a piston. This invention also relates to a method for effecting the installation of a multi-piece piston ring into the ring-receiving groove of a piston.

This invention has as an object the provision of an assembled multi-piece piston ring unit which permits rapid and facile installation of the separable sealing and spacing elements thereof into the ring-receiving groove of a piston.

A further object of this invention is the provision of a method for effecting the installation of a multi-piece piston ring into the ring-receiving groove of a piston.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

In the accompanying drawings in which like reference characters indicate like parts, Figure 1 represents a perspective view of a 3-piece piston ring assembly of one embodiment of the present invention.

Figure 2 represents a perspective view showing the application of the piston ring assembly to a piston, in the course of its installation.

Figure 3 represents a section on line 3—3 of Figure 1, on a somewhat enlarged scale.

Figure 6 represents a perspective view of one of the clamps.

Figure 9 represents a perspective view of a somewhat modified form of clamp.

Figure 4:
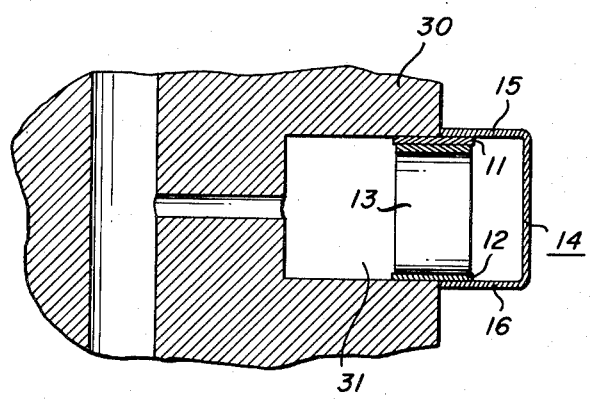
Figure 4 represents a fragmentary section through the piston, and through the ring-assembly of the present invention at an intermediate stage of the application of the assembly to the piston in the clamp zone of the assembly.

The piston ring assembly or unit 10 comprises a pair of cylinder-contacting ring-elements 11 and 12 and an intermediate generally corrugated spacer element 13 which does not contact the cylinder.

The cylinder-contacting ring-elements 11 and 12 may either be self-expanding, that is with outward radial tension built into the elements 11 and 12, or these elements may be without any appreciable or sufficient outward radial expansion of their own, and may be urged radially outwardly by any suitable expander element, either of the bottoming type or of the non-bottoming type.

The assembly also comprises a generally U cross-sectioned clamp or retainer 14, or a plurality of such clamps. Clamp 14 is formed of thin spring sheet steel or other suitable resilient material, with the legs or flanges 15 and 16 of the U tensioned inwardly towards each other, so that when removed from the assembly shown in Figure 1 these legs or flanges 15 and 16 will be inclined or converging towards each other at a slight angle, and so that when the legs are forced onto the two ring-elements 11 and 12, they will be sprung to a more or less parallel relationship to each other, thereby exerting a clamping force upon the three elements 11, 12 and 13. The legs 15 and 16 each have a width greater than the available clearance between the elements 11 and 12 and the walls of the ring-receiving groove of the piston in which the elements 11, 12 and 13 are operatively positioned.

The base or intervening web 17 of the U is preferably of a width more or less equal to the combined width of the three elements 11, 12 and 13. The clamp-element 14 is preferably also formed on a slight arc, corresponding generally to the outward curvature of the ring-elements 11 and 12. The radial width of the flanges 15 and 16 is preferably substantially the same as the radial width of the ring elements 11 and 12.

To facilitate the application of the clamp or clamps 14 to the three ring-elements 11, 12 and 13, one or both juxtaposed sets of corners 18 and/or 19 of the flanges 15 and 16 may be turned outwardly slightly, so as to give the flanges a slight wedging lead over the ring-elements 11 and 12.

Figure 7:
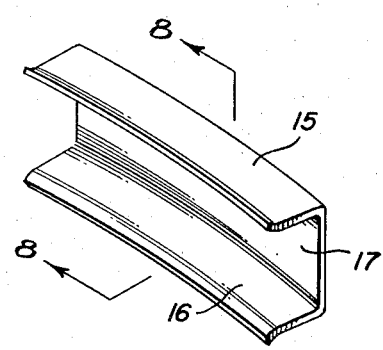
Figure 7 represents a perspective view of a somewhat modified form of clamp.
Figure 8:
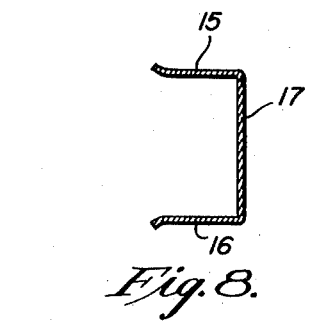
Figure 8 represents a section on line 8—8 of Figure 7.

In the embodiment shown in Figures 7 and 8, the free circumferential edges of the flanges 15 and 16 are turned outwardly slightly, for purposes of leading the clamp onto the ring-elements 11, 12 and 13.

In the embodiment shown in Figure 9 the center portion of the free circumferential edges of the flanges 15 and 16 comprise outwardly flared lips 18a, for purposes of leading the clamp onto the ring-elements 11, 12 and 13.

In applying the retainers or clamps 14, one such retainer is preferably applied at or near one of the ends 22 and 23 adjacent the gap of the ring, as at 20. In the illustration shown, this application is near the end 22, although it may be moved away from the end 22 an appreciable extent. A second clamp may be applied at a point diametrically opposite or between the diametrically opposite point and the other free end 23 of the ring, as, for instance, at 21.

Figure 5:
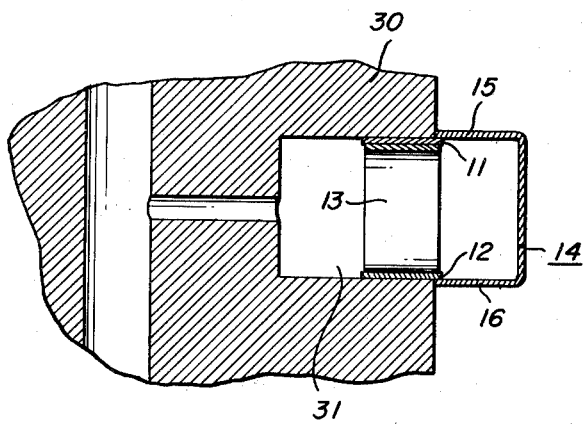
Figure 5 represents a similar cross-section in a further advanced stage of the application of the assembly to the piston, as the assembly is about to be freed of its clamp.

In applying the assembled ring to piston 30 (see Figures 2, 4 and 5), the end 22 of the ring is inserted into the ring-receiving groove 31 of the piston 30, while the opposite end 23 is spiraled out of the plane of the ring-receiving groove 31 and from the end 22 in the direction of the arrow 24. As the ring is worked into the groove 31, the piston-wall immediately adjacent to groove 31 engages the two edges of the legs 15 and 16 of the clamp 15 (see Figures 4 and 5), and pries the clamp 14 off the ring-elements 11 and 12, until it falls off. As the ring is further and progressively worked into the ring-receiving groove 31 until the portion 21 of the ring starts to enter the ring-receiving groove 31 then the second clamp will be simultaneously pried off the ring-elements 11 and 12. By this time, a sufficient portion of the circumference of the assembled ring has entered ring-receiving groove 31 so that the remainder of the assembled ring may readily be fed into or moved into the ring-receiving groove, without loosing the assembled relationship between the elements 11, 12 and 13.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having fully described my invention, I claim:

1. A multi-piece piston ring unit comprising separable sealing elements, at least one detachable U cross-sectioned resilient spring-clamp resiliently embracing and frictionally reetaining the separable sealing elements in operative relationship to each other and resiliently urging the sealing elements towards each other, the ends of the legs of the U having a thickness greater than the available clearance between the sealing elements and the walls of the ring-receiving groove of the piston into which the multi-piece piston ring unit is to be installed, the base of the U being radially outwardly of the sealing elements, whereby the sealing elements are maintained assembled in operative relationship to each other prior to and during installation in the ring-receiving groove and whereby the U clamp is pushed off the sealing elements by the wall of the piston adjacent the ring-receiving groove when the so assembled sealing elements are installed in the ring-receiving groove.

2. A multi-piece piston ring unit comprising separable sealing elements, at least one detachable U cross-sectioned resilient spring-clamp resiliently embracing and frictionally retaining the separable sealing elements in operative relationship to each other and resiliently urging the sealing elements towards each other, the ends of the legs of the U having a thickness greater than the available clearance between the sealing elements and the walls of the ring-receiving groove of the piston into which the multi-piece piston ring unit is to be installed, at least a portion of the lips of said U cross-sectioned spring-clamp flared outwardly, the base of the U being radially outwardly of the sealing elements, whereby the sealing elements are maintained assembled in operative relationship to each other prior to and during installation in the ring-receiving groove and whereby the U clamp is pushed off the sealing elements by the wall of the piston adjacent the ring-receiving groove when the so-assembled sealing elements are installed in the ring-receiving groove.

3. A multi-piece piston ring unit comprising separable sealing and spacing elements, at least one detachable U cross-sectioned resilient spring-clamp resiliently embracing and frictionally retaining the separable sealing and spacing elements in operative relationship to each other and resiliently urging the sealing elements against the spacer-element, the ends of the legs of the U having a thickness greater than the available clearance between the sealing elements and the walls of the ring-receiving groove of the piston into which the multi-piece piston ring unit is to be installed, the base of the U being radially outwardly of the sealing and spacing elements, whereby the sealing and spacing elements are maintained assembled in operative relationship to each other prior to and during installation in the ring-receiving groove and whereby the U clamp is pushed off the sealing and spacing elements by the wall of the piston adjacent the ring-receiving groove when the so assembled sealing and spacing elements are installed in the ring-receiving groove.

4. A multi-piece piston ring unit comprising separable sealing and spacing elements, at least one detachable U cross-sectioned resilient spring-clamp resiliently embracing and frictionally retaining the separable sealing and spacing elements in operative relationship to each other and spring-urging the sealing elements against the spacer-element, the ends of the legs of the U having a thickness greater than the available clearance between the sealing elements and the walls of the ring-receiving groove of the piston into which the assembled sealing and spacing elements are installed, the free edges of the legs of the U turned outwardly, the base of the U being radially outwardly of the sealing and spacing elements, whereby the sealing and spacing elements are maintained assembled in operative relationship to each other prior to and during installation in the ring-receiving groove and whereby the U clamp is pushed off the sealing and spacing elements by the wall of the piston adjacent the ring-receiving groove when the so assembled sealing and spacing elements are installed in the ring-receiving groove.

5. A multi-piece piston ring unit comprising separable sealing and spacing elements, at least one detachable U cross-sectioned resilient spring-clamp resiliently embracing and frictionally retaining the separable sealing and spacing elements in operative relationship to each other and spring-urging the sealing elements against the spacer-element, the ends of the legs of the U having a thickness greater than the available clearance between the sealing elements and the walls of the ring-receiving groove of the piston into which the assembled sealing and spacing elements are installed, corners of the legs of the U turned outwardly, the base of the U being radially outwardly of the sealing and spacing elements, whereby the sealing and spacing elements are maintained assembled in operative relationship to each other prior to and during installation in the ring-receiving groove and whereby the U clamp is pushed off the sealing and spacing elements by the wall of the piston adjacent the ring-receiving groove when the so assembled sealing and spacing elements are installed in the ring-receiving groove.

6. A multi-piece piston ring unit comprising separable sealing and spacing elements, at least one detachable U cross-sectioned resilient spring-clamp resiliently embracing and frictionally retaining the separable sealing and spacing elements in operative relationship to each other and spring-urging the sealing elements against the spacer-element, the ends of the legs of the U having a thickness greater than the available clearance between the sealing elements and the walls of the ring-receiving groove of the piston into which the assembled sealing and spacing elements are installed, the center portion of the free edges of the legs of the U turned outwardly, the base of the U being radially outwardly of the sealing and spacing elements, whereby the sealing and spacing elements are maintained assembled in operative relationship to each other prior to and during installation in the ring-receiving groove and whereby the U clamp is pushed off the sealing and spacing elements by the wall of the piston adjacent the ring-receiving groove when the so assembled sealing and spacing elements are installed in the ring-receiving groove.

7. A multi-piece piston ring unit comprising separable sealing and spacing elements, at least one detachable U cross-sectioned resilient spring-clamp, having legs normally tensioned inwardly towards each other, resiliently embracing and frictionally retaining the separable sealing and spacing elements in operative relationship to each other and spring-urging the sealing elements against the spacer-element, the legs of the U having a radial width substantially the same as that of the sealing elements, the ends of the legs of the U having a thickness greater than the available clearance between the sealing elements and the walls of the ring-receiving groove of the piston into which the assembled sealing and spacing elements are installed, the base of the U being radially outwardly of the sealing and spacing elements, whereby the sealing and spacing elements are maintained assembled in operative relationship to each other prior to and during installation in the ring-receiving groove and whereby the U clamp is pushed off the sealing and spacing elements by the wall of the piston adjacent the ring-receiving groove when the so assembled sealing and spacing elements are installed in the ring-receiving groove.

References Cited in the file of this patent

UNITED STATES PATENTS

| | | |
|---|---|---|
| 1,367,622 | Monckmeier | Feb. 8, 1921 |
| 1,515,472 | Frank | Nov. 11, 1924 |
| 1,856,279 | Hellman | May 3, 1932 |
| 2,021,572 | Wuerfel | Nov. 19, 1935 |
| 2,148,997 | Phillips | Feb. 28, 1939 |
| 2,281,873 | Engelhardt | May 5, 1942 |